US011328592B2

(12) United States Patent
Saleh et al.

(10) Patent No.: US 11,328,592 B2
(45) Date of Patent: May 10, 2022

(54) SYSTEMS AND METHODS FOR ROADWAY OBSTRUCTION DETECTION

(71) Applicant: Toyota Motor North America, Inc., Plano, TX (US)

(72) Inventors: Aghyad Saleh, Grand Prairie, TX (US); Jason Schell, Dallas, TX (US); Neil Dutta, Addison, TX (US)

(73) Assignee: Toyota Motor North America, Inc., Plano, TX (US)

( * ) Notice: Subject to any disclaimer, the term of this patent is extended or adjusted under 35 U.S.C. 154(b) by 366 days.

(21) Appl. No.: 16/540,676

(22) Filed: Aug. 14, 2019

(65) Prior Publication Data

US 2021/0049906 A1 Feb. 18, 2021

(51) Int. Cl.
| G08G 1/0967 | (2006.01) |
| G08G 1/0968 | (2006.01) |
| H04W 4/44 | (2018.01) |
| G08G 1/01 | (2006.01) |
| G01C 21/34 | (2006.01) |
| H04W 84/18 | (2009.01) |

(52) U.S. Cl.
CPC ............ *G08G 1/096775* (2013.01); *G01C 21/3415* (2013.01); *G08G 1/0125* (2013.01); *G08G 1/096844* (2013.01); *H04W 4/44* (2018.02); *H04W 84/18* (2013.01)

(58) Field of Classification Search
CPC .......... G08G 1/0125; G08G 1/096844; H04W 4/44; H04W 84/18; G01C 21/3415
USPC ....................................................... 701/117
See application file for complete search history.

(56) References Cited

U.S. PATENT DOCUMENTS

| 10,163,350 B1 * | 12/2018 | Fields ................ G07C 5/0816 |
| 10,393,532 B2 * | 8/2019 | Foreman ............ G01C 21/3415 |
| 11,079,492 B1 * | 8/2021 | Stumm .................. G01C 21/30 |

(Continued)

FOREIGN PATENT DOCUMENTS

| CN | 104903915 B | * | 6/2019 | ......... H04N 5/23229 |
| CN | 109933064 A | * | 6/2019 | ........... G05D 1/0033 |

(Continued)

OTHER PUBLICATIONS

M. Finnefrock, "Visual-based "Assistance for Electric Vehicle Driving, 2005, Publisher: IEEE.*
Ruisi et al., "Vehicle-to-Vehicle Propagation Models With Large Vehicle Obstructions," 2014, vol. 15, Publisher: IEEE.*

(Continued)

*Primary Examiner* — Tuan C To
(74) *Attorney, Agent, or Firm* — Christopher G. Darrow; Darrow Mustafa PC

(57) ABSTRACT

Systems and methods for roadway obstruction detection are disclosed herein. One embodiment receives information pertaining to a potential roadway obstruction; determines that additional information regarding the potential roadway obstruction is needed to identify the potential roadway obstruction; selects one or more vehicles from a plurality of vehicles based, at least in part, on their proximity to the potential roadway obstruction and their sensor capabilities; and determines that the potential roadway obstruction is a specific type of roadway obstruction based, at least in part, on additional information regarding the potential roadway obstruction received from at least one of the selected one or more vehicles.

15 Claims, 4 Drawing Sheets

(56) References Cited

U.S. PATENT DOCUMENTS

| | | | | |
|---|---|---|---|---|
| 2010/0256836 | A1* | 10/2010 | Mudalige | G08G 1/164 |
| | | | | 701/2 |
| 2014/0335797 | A1* | 11/2014 | Cooper | H04W 8/005 |
| | | | | 455/67.13 |
| 2016/0054452 | A1* | 2/2016 | Cosatto | G01S 19/48 |
| | | | | 701/412 |
| 2017/0096138 | A1* | 4/2017 | Reiff | B60W 30/0956 |
| 2017/0276495 | A1* | 9/2017 | Krishnan | G08G 1/096741 |
| 2018/0341274 | A1* | 11/2018 | Donnelly | G08G 1/0137 |
| 2018/0342157 | A1* | 11/2018 | Donnelly | G08G 1/0137 |
| 2018/0354411 | A1* | 12/2018 | Shmueli Friedland | |
| | | | | G05D 1/0246 |
| 2019/0094884 | A1* | 3/2019 | Aitken | G01C 21/00 |
| 2019/0197902 | A1* | 6/2019 | Shin | B60W 10/20 |
| 2019/0352869 | A1* | 11/2019 | Gupta | E01F 9/658 |
| 2020/0201349 | A1* | 6/2020 | Ha | G08G 1/163 |
| 2020/0272832 | A1* | 8/2020 | Urano | G06K 9/00805 |
| 2020/0278693 | A1* | 9/2020 | Vijaya Kumar | G06K 9/00201 |

FOREIGN PATENT DOCUMENTS

| | | | | | |
|---|---|---|---|---|---|
| CN | 109969177 | A | * | 7/2019 | B60W 60/0027 |
| DE | 102014015075 | B4 | * | 7/2019 | G05D 1/0246 |

OTHER PUBLICATIONS

Yusuke et al, "Performance Evaluation of Vehicle Cooperative Driving Assistance Systems that Uses Forward Obstruction Detecting Sensors and Inver-Vehicle Communication," 2009, Publisher: IEEE.*

Cárdenas-Benitez et al, "Traffic Congestion Detection System through Connected Vehicles and Big Data," Apr. 28, 2016, found at https://www.ncbi.nlm.nih.gov/pmc/articles/PMC4883290/pdf/sensors-16-00599.pdf.

Chawla et al., "Inferring the Root Cause in Road Traffic Anomalies," Dec. 2012, found at http://citeseerx.ist.psu.edu/viewdoc/download?doi=10.1.1.592.7582&rep=rep1&type=pdf.

El-Sersy et al., "Survey of Traffic Congestion Detection Using VANET," Mar. 2015, found at https://pdfs.semanticscholar.org/f8b7/8133819b25413e39be65e18a20e6b5d1610a.pdf.

Kar et al., "Real-time Traffic Estimation at Vehicular Edge Nodes," Oct. 2017, found at http://www.winlab.rutgers.edu/~gruteser/papers/sedgec17-final42.pdf.

Manoj et al., "Effective Road Model for Congestion Control in VANETs," May 2016, found at https://arxiv.org/ftp/arxiv/papers/1605/1605.03393.pdf.

Martuscelli et al., "V2V Protocols for Traffic Congestion Discovery Along Routes of Interest in VANETs: A Quantitative Study," Sep. 21, 2016, found at https://onlinelibrary.wiley.com/doi/epdf/10.1002/wcm.2729.

* cited by examiner

SYSTEMS AND METHODS FOR ROADWAY OBSTRUCTION DETECTION

TECHNICAL FIELD

The subject matter described herein generally relates to vehicles and, more particularly, to systems and methods for roadway obstruction detection.

BACKGROUND

Traffic reporting systems that report traffic disruptions (e.g., traffic jams due to high vehicle volume, road closures, etc.) to vehicles or mobile devices have become more common in recent years. One weakness of conventional traffic reporting systems is that they sometimes fail to capture and report traffic disruptions caused by sudden, unexpected roadway obstructions such as a foreign object that has fallen from a truck onto the roadway, a stalled vehicle, a temporary barricade (e.g., due to construction or an accident), or one or more vehicles associated with an accident, including emergency vehicles, that are blocking one or more lanes.

SUMMARY

An example of a system for roadway obstruction detection is presented herein. The system comprises one or more processors and a memory communicably coupled to the one or more processors. The memory stores an obstruction monitoring module including instructions that when executed by the one or more processors cause the one or more processors to receive information pertaining to a potential roadway obstruction. The obstruction monitoring module also includes instructions to determine that additional information regarding the potential roadway obstruction is needed to identify the potential roadway obstruction. The memory also stores an obstruction characterization module that includes instructions to select one or more vehicles from a plurality of vehicles based, at least in part, on their proximity to the potential roadway obstruction and their sensor capabilities. The obstruction characterization module also includes instructions to determine that the potential roadway obstruction is a specific type of roadway obstruction based, at least in part, on additional information regarding the potential roadway obstruction received from at least one of the selected one or more vehicles.

Another embodiment is a non-transitory computer-readable medium for roadway obstruction detection and storing instructions that when executed by one or more processors cause the one or more processors to receive information pertaining to a potential roadway obstruction. The instructions also cause the one or more processors to determine that additional information regarding the potential roadway obstruction is needed to identify the potential roadway obstruction. The instructions also cause the one or more processors to select one or more vehicles from a plurality of vehicles based, at least in part, on their proximity to the potential roadway obstruction and their sensor capabilities. The instructions also cause the one or more processors to determine that the potential roadway obstruction is a specific type of roadway obstruction based, at least in part, on additional information regarding the potential roadway obstruction received from at least one of the selected one or more vehicles.

In another embodiment, a method of roadway obstruction detection is disclosed. The method comprises receiving information pertaining to a potential roadway obstruction. The method also includes determining that additional information regarding the potential roadway obstruction is needed to identify the potential roadway obstruction. The method also includes selecting one or more vehicles from a plurality of vehicles based, at least in part, on their proximity to the potential roadway obstruction and their sensor capabilities. The method also includes determining that the potential roadway obstruction is a specific type of roadway obstruction based, at least in part, on additional information regarding the potential roadway obstruction received from at least one of the selected one or more vehicles.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
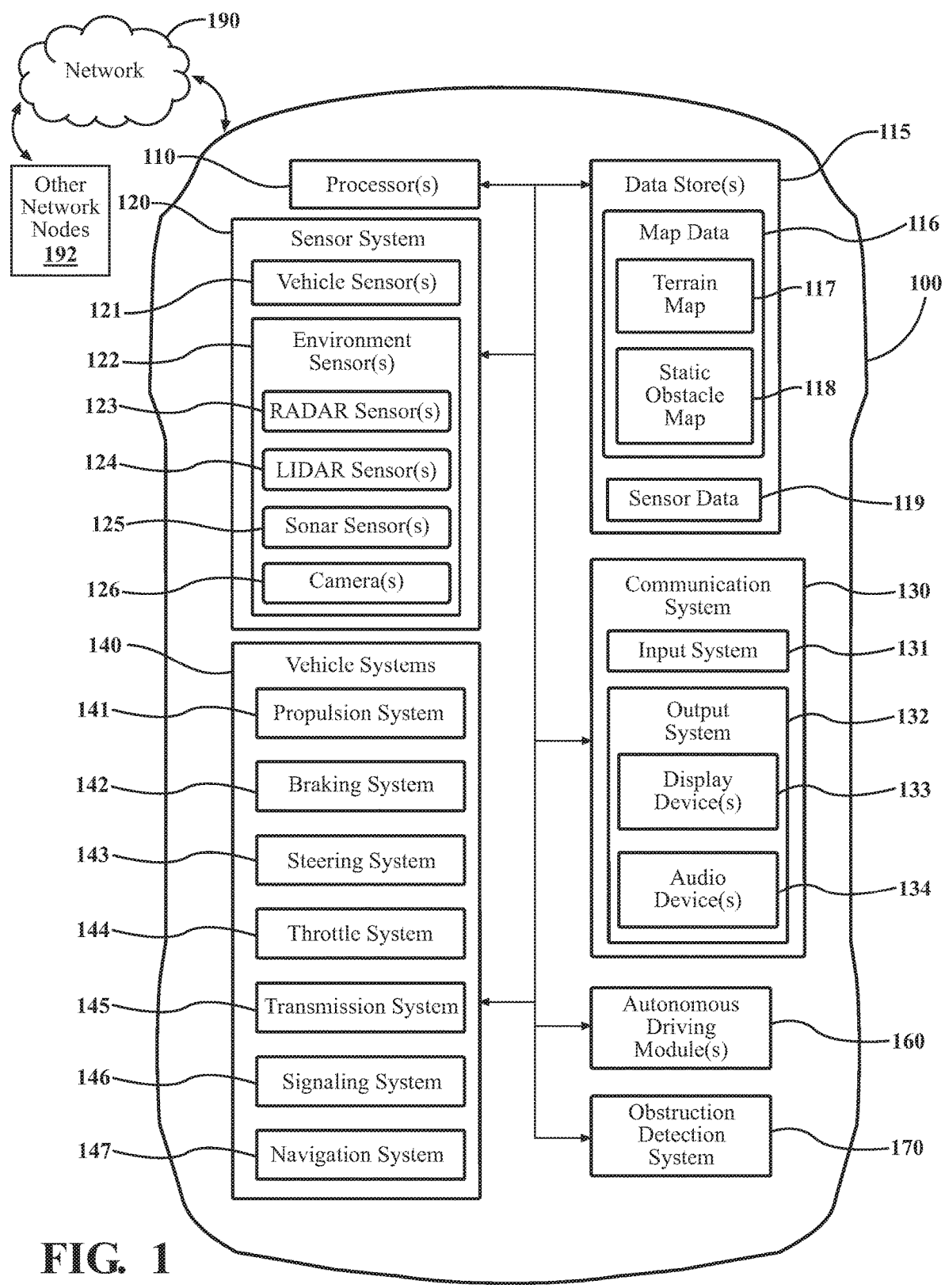
FIG. 1 illustrates one embodiment of a vehicle within which systems and methods disclosed herein may be implemented.

The various embodiments described herein employ a collaborative, vehicle-based approach to detecting obstructions on a roadway and reporting obstructions to vehicles that could potentially encounter the obstructions. In one embodiment, a roadway obstruction detection system receives information pertaining to a potential roadway obstruction. This kind of information can come from, for example, one or more connected vehicles equipped with sensors or from a vehicle's own sensors. Roadway obstructions can include, without limitation, a foreign object on the roadway, a stalled vehicle, a barricade (e.g., associated with construction or an accident), and one or more vehicles associated with an accident, including emergency vehicles (e.g., a police car, an ambulance, or a fire engine). In some situations, the system may determine that additional information is needed to determine that the potential roadway obstruction is a specific type of roadway obstruction. For example, a connected vehicle's sensors may detect the presence of a stationary object in a particular lane of a roadway, but the sensor data might be insufficient to determine that the stationary object is a mattress that has fallen out of the bed of a pickup truck onto the roadway.

To obtain additional information about the potential roadway obstruction, the system can select one or more vehicles from among a plurality of vehicles based, at least in part, on their proximity to the potential roadway obstruction and their sensor capabilities. For example, the system can select vehicles that are in the vicinity of the potential roadway obstruction and that are equipped with image sensors, Light Detection and Ranging (LIDAR) sensors, or both. Based, at least in part, on additional information about the potential roadway obstruction received from at least one of the one or more selected vehicles, the system can determine that the potential roadway obstruction is a specific type of roadway obstruction. In the example mentioned above, it might be determined that the potential roadway obstruction is a "mattress" or "large rectangular foreign object."

In some embodiments, once the potential roadway obstruction has been identified, the roadway obstruction detection system can transmit specific information about the obstruction to at least one vehicle in the plurality of vehicles mentioned above (e.g., vehicles within a predefined geographic area). In some embodiments, the system additionally transmits rerouting information to at least one vehicle in the plurality of vehicles. The rerouting information can enable the vehicles receiving it to avoid the identified roadway obstruction and any associated traffic disruptions. In some embodiments, at least some of the vehicles in the plurality of vehicles are autonomous vehicles. The system can also transmit, to at least one vehicle in the plurality of vehicles, updated information regarding estimated time of arrival (ETA), fuel economy, or both in connection with the rerouting information. An alternative route to avoid an identified roadway obstruction can impact both ETA and fuel economy, and updated ETA and/or fuel-economy information can permit a driver or an autonomous vehicle to make informed choices regarding navigation options in the face of traffic disruptions.

Referring to FIG. 1, an example of a vehicle 100, in which systems and methods disclosed herein can be implemented, is illustrated. The vehicle 100 can include an obstruction detection system 170 or components and/or modules thereof. As used herein, a "vehicle" is any form of motorized transport. In one or more implementations, the vehicle 100 can be an automobile. In some implementations, the vehicle 100 may be any other form of motorized transport that, for example, can function manually under the control of an in-vehicle operator, semi-autonomously, or autonomously. The vehicle 100 can include the obstruction detection system 170 or capabilities to support or interact with the obstruction detection system 170 and thus benefits from the functionality discussed herein. While arrangements will be described herein with respect to automobiles, it will be understood that implementations are not limited to automobiles. Instead, implementations of the principles discussed herein can be applied to any kind of vehicle. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including obstruction detection system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with other network nodes 192 (e.g., other vehicles, servers, roadside infrastructure, etc.) via network 190.

Some of the possible elements of the vehicle 100 are shown in FIG. 1 and will be described in connection with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Figure 2:
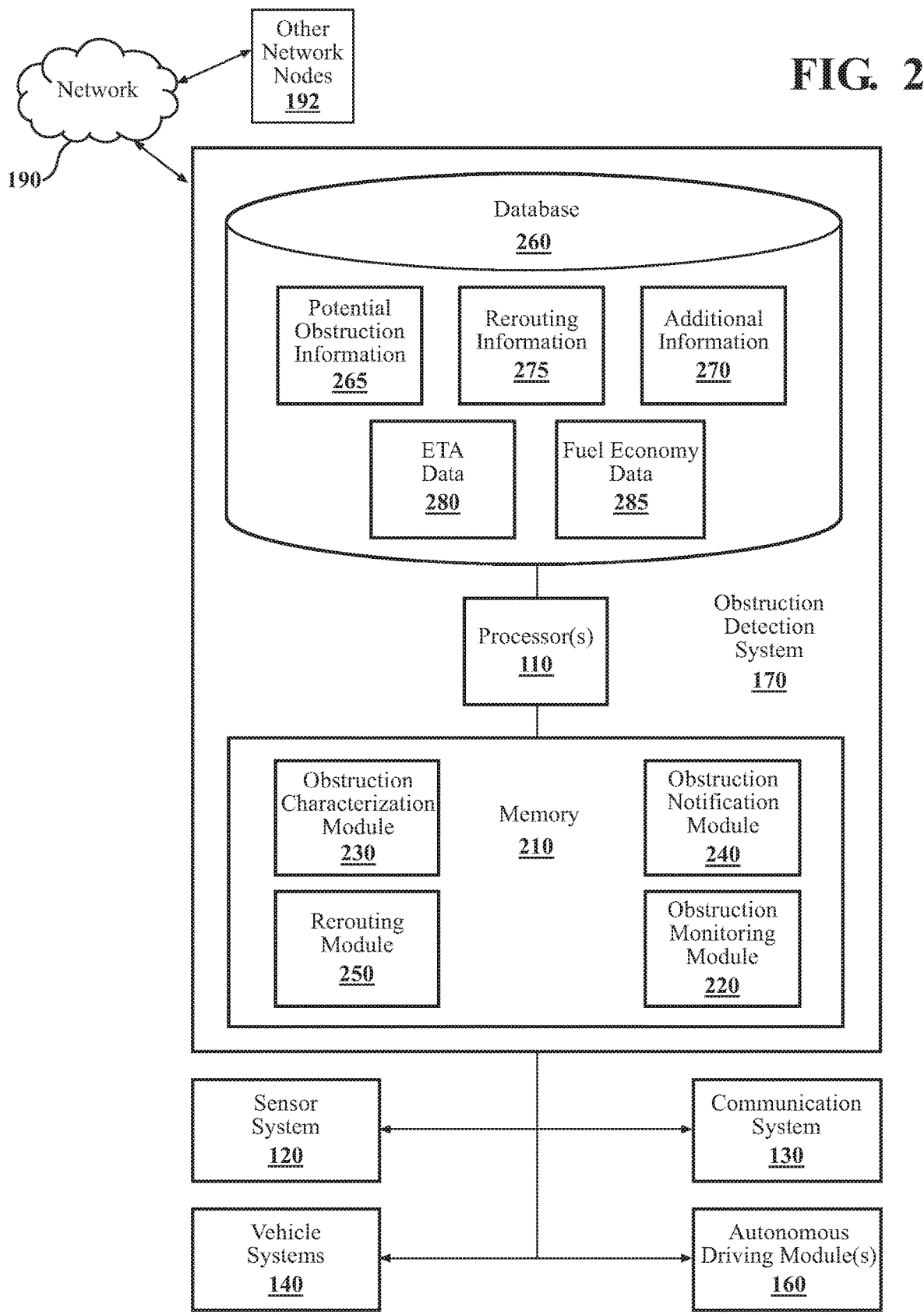
FIG. 2 illustrates one embodiment of an obstruction detection system.

Referring to FIG. 2, one embodiment of the obstruction detection system 170 of FIG. 1 is further illustrated. In this particular embodiment, obstruction detection system 170 is shown as including one or more processors 110 from the vehicle 100 of FIG. 1. In other embodiments, the one or more processors 110 and some or all of the remaining elements of obstruction detection system 170, including memory 210 and its contents, can instead be implemented in one or more servers or other computing devices that are separate from vehicle 100 and located remotely. In one embodiment, obstruction detection system 170 is implemented in a central server with which one or more vehicles can communicate via network 190. In general, the one or more processors 110 may be a part of obstruction detection system 170, obstruction detection system 170 may include one or more separate processors from the one or more processors 110 of the vehicle 100, or obstruction detection system 170 may access the one or more processors 110 through a data bus or another communication path, depending on the embodiment.

In one embodiment, memory 210 stores an obstruction monitoring module 220, an obstruction characterization module 230, an obstruction notification module 240, and a rerouting module 250. The memory 210 is a random-access memory (RAM), read-only memory (ROM), a hard-disk drive, a flash memory, or other suitable memory for storing the modules 220, 230, 240, and 250. The modules 220, 230, 240, and 250 are, for example, computer-readable instructions that when executed by the one or more processors 110, cause the one or more processors 110 to perform the various functions disclosed herein.

As shown in FIG. 2, obstruction detection system 170 can communicate with other network nodes 192 (e.g., other vehicles, servers, roadside infrastructure, etc.) via network 190. In embodiments in which obstruction detection system 170 is integrated with vehicle 100, obstruction detection system 170 can receive sensor data such as image data, LIDAR data, RADAR data, sonar data, or a combination of these from the vehicle's own sensor system 120, as well as similar sensor data or other communications from other connected vehicles. In embodiments in which obstruction detection system 170 is integrated with vehicle 100, obstruction detection system 170 can also communicate with various vehicle systems 140, communication system 130, and autonomous driving module(s) 160 (refer to FIG. 1).

Obstruction monitoring module 220 generally includes instructions that cause the one or more processors 110 to monitor environmental conditions for a roadway obstruction ("obstruction"). In one embodiment, obstruction monitoring module 220 receives information (potential obstruction information 265 in FIG. 2) pertaining to a potential roadway obstruction ("potential obstruction"). Obstruction monitoring module 220 also includes instructions to determine that additional information regarding a potential obstruction is needed to identify the potential obstruction.

A potential obstruction is one that has not yet been confirmed or identified with specificity. For example, a vehicle might detect a stationary object on the roadway but be unable to identify or otherwise characterize the object. This can occur for a variety of reasons, such as the vehicle not having the correct type of sensors to identify the object (e.g., the vehicle might have sonar sensors for detecting whether parking spaces are open or occupied but lack cameras or LIDAR sensors for identifying objects), the vehicle being too far away from the stationary object to reliably identify it, or the vehicle's sensors having a partially obstructed view of the stationary object. Obstruction monitoring module 220 can receive information pertaining to the potential obstruction from, for example, one or more vehicles with which the vehicle was already in communication prior to receiving the information. Membership in this kind of vehicular communication network can be based on factors such as vehicle make/model, location within a predefined geographic area, sensor reliability, and sensor availability. In some embodiments, the communication network or communication networks via which obstruction detection system 170 communicates with one or more vehicles can include a mesh network. Such a mesh network can operate in a multi-hop fashion, in some embodiments. As shown in FIG. 2, potential obstruction information 265 can be stored in a database 260.

In some embodiments, the received information pertaining to a potential obstruction (potential obstruction information 265) is in the form of a notification or alert from one or more networked vehicles that a potential obstruction (e.g., an unidentified stationary object) has been detected. In other embodiments, obstruction monitoring module 220 receives raw sensor data from one or more networked vehicles, and obstruction monitoring module 220 analyzes the raw sensor data to determine that a potential obstruction exists. For example, obstruction monitoring module 220 might, from the raw sensor data, detect a stationary object in a location that, according to available map data 116 (see FIG. 1), should not be present. In some embodiments, the map data 116 is high-definition (HD) map data.

Obstruction monitoring module 220 can also determine that additional information regarding the potential obstruction is needed to identify or otherwise characterize the potential obstruction. When this situation occurs, the needed information can be obtained via obstruction characterization module 230.

Obstruction characterization module 230 generally includes instructions that cause the one or more processors 110 to obtain, from one or more networked vehicles, additional information regarding a potential obstruction and to determine, based at least in part on the additional information, that the potential obstruction is a specific type of roadway obstruction.

To obtain the additional information regarding the potential obstacle, obstruction characterization module 230 selects one or more vehicles from among a plurality of vehicles within a predefined geographical area based, at least in part, on their proximity to the potential obstruction and their particular sensor capabilities. That is, obstruction characterization module 230 selects vehicles that are relatively close to the potential obstruction, that are expected to pass near the potential obstruction, and that have sensors (e.g., image and/or LIDAR sensors) capable of providing additional details about the potential obstruction. The predefined geographical area can vary in size, depending on the particular embodiment. In some embodiments, the predefined geographical area is an approximately circular region within a certain radius of a specified reference point. In other embodiments, the predefined geographical area is an arbitrarily shaped region. In some embodiments, the predefined geographical area encompasses a portion of a town or city (e.g., a neighborhood or portion of a neighborhood). In other embodiments, the predefined geographical area encompasses an entire city or town.

Obstruction characterization module 230 can receive additional information regarding a potential obstruction from at least one of the selected one or more vehicles mentioned above. In some embodiments, the network via which obstruction characterization module 230 communicates with one or more vehicles includes a peer-to-peer network of connected vehicles such as a mesh network. In some embodiments, the mesh network is a multi-hop network. In some embodiments, the additional information 270 (see FIG. 2) includes an identification or other characterization of the potential obstruction as a specific type of roadway obstruction (e.g., a foreign object, a stalled vehicle, a barricade, or one or more vehicles associated with an accident). Such an identification can be based on an analysis of sensor data by a connected vehicle's object-recognition subsystem. In other embodiments, obstruction characterization module 230 receives the additional information 270 as raw sensor data, and obstruction characterization module 230 analyzes the raw sensor data to identify the potential obstruction as a specific type of roadway obstruction. As indicated in FIG. 2, additional information 270 can be stored in database 260.

Some embodiments include obstruction notification module 240. Obstruction notification module 240 generally includes instructions that cause the one or more processors 110 to transmit information regarding an identified specific type of roadway obstruction to at least one vehicle in the plurality of vehicles discussed above. Depending on the particular embodiment, transmitting, to one or more vehicles, information regarding identified obstructions can be implemented in various ways. In some embodiments, the information is transmitted via a network of connected vehicles (e.g., via a peer-to-peer mesh network). In other embodiments, the notification information is uploaded from a vehicle to a central server or a set of servers, and the one or more servers serve (transmit) the information to one or more connected vehicles.

Some embodiments include rerouting module 250. Rerouting module 250 generally includes instructions that cause the one or more processors 110 to aid one or more networked vehicles in traveling a route that avoids an identified roadway obstruction. This can include identifying an alternate route based on a routing algorithm and map data 116 (see FIG. 1). Once rerouting module 250 has determined an alternate route, rerouting module 250 can transmit the rerouting information 275 to at least one vehicle in the plurality of vehicles discussed above. The rerouting information 275 can enable the vehicles receiving it to avoid the identified roadway obstruction and possible traffic disruptions associated with the identified roadway obstruction. As depicted in FIG. 2, the rerouting information 275 can be stored in database 260.

Since an alternate route can impact both ETA and fuel economy, in some embodiments, rerouting module 250 transmits, to one or more vehicles in the plurality of vehicles, updated information regarding ETA (ETA data 280), updated information regarding fuel economy (fuel economy data 285), or both based on the rerouting information. This information can be of particular value to, for example, operators of commercial vehicle fleets. As indicated in FIG. 2, ETA data 280 and fuel economy data 285 can be stored in database 260.

Figure 3:
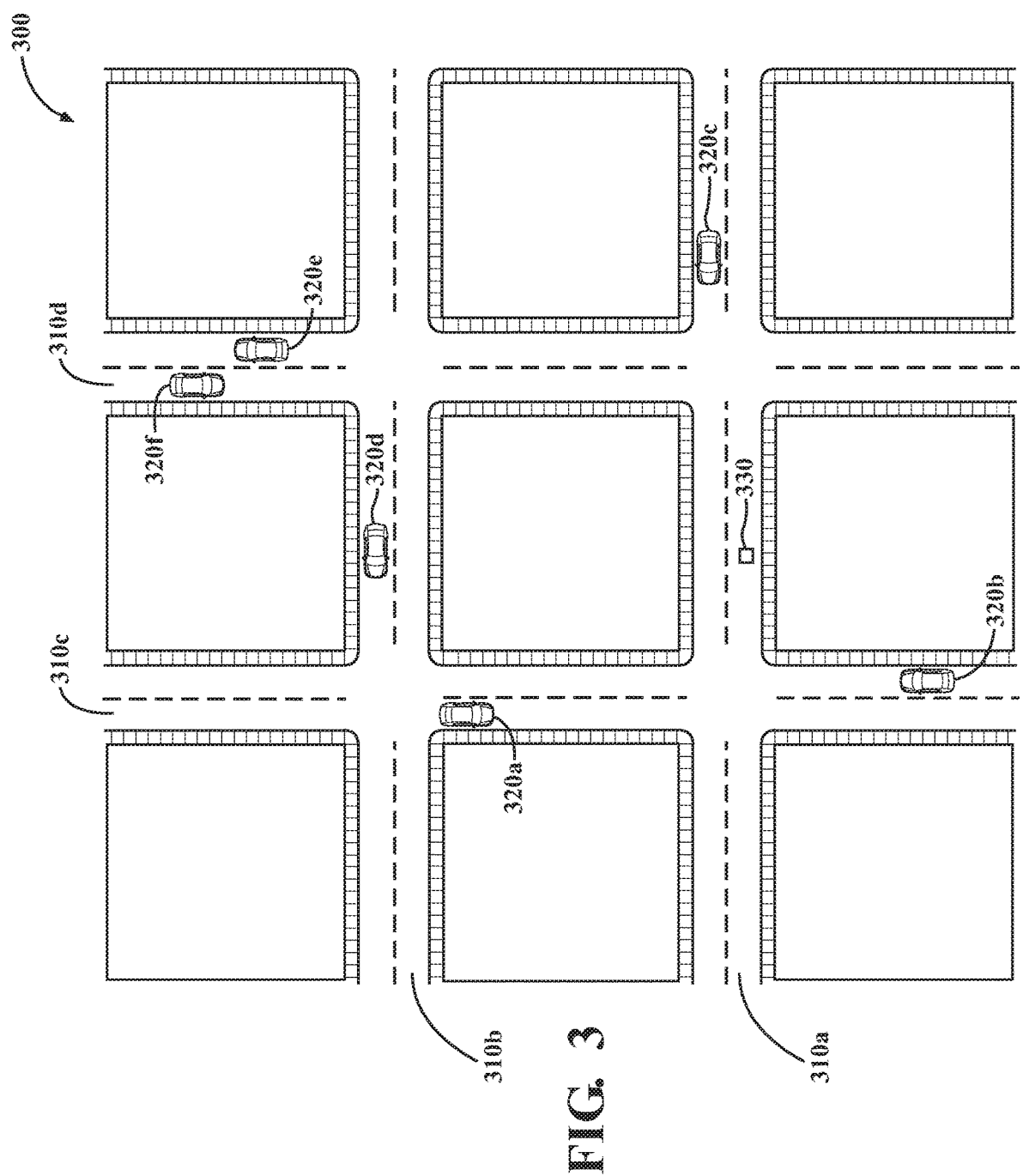
FIG. 3 illustrates a predefined geographic area within which a roadway obstruction is detected, in accordance with an illustrative embodiment of the invention.

FIG. 3 illustrates a predefined geographic area within which a roadway obstruction is detected, in accordance with an illustrative embodiment of the invention. In the simplified example shown in FIG. 3, predefined geographic area 300 encompasses a number of city blocks in an urban setting. Predefined geographical area 300 includes roadways 310a-d and is occupied by vehicles 320a-f. Within predefined geographical area 300, there is an obstruction 330 (e.g., a foreign object on roadway 310a) present. In this illustrative scenario, one or more sensors of vehicle 320c have detected a stationary object of undetermined identity at the location of obstruction 330. Vehicle 320c transmits either a notification of the potential obstruction or raw sensor data, as discussed above, to obstruction detection system 170. As discussed above, obstruction detection system 170 can be integrated with one or more vehicles 100 in a distributed fashion, or the functionality of obstruction detection system 170 can be implemented in one or more servers with which connected vehicles communicate.

After receiving the potential obstruction information 265 from vehicle 320c, obstruction monitoring module 220 determines that additional information regarding the potential obstruction is needed to identify or otherwise more fully characterize the potential obstruction. Obstruction characterization module 230 then determines that vehicles 320a and 320b are both in the general vicinity of the potential obstruction and that both vehicles are equipped with cameras and/or LIDAR sensors. Obstruction characterization module 230 selects vehicles 320a and 320b with which to communicate over network 190 and subsequently receives, from one or more of vehicles 320a and 320b, either an identification or other characterization of obstruction 330 or raw sensor data that obstruction characterization module 230 can analyze to identify and otherwise characterize obstruction 330. Other examples of "characterization" can include the color, size, shape, etc., of obstruction 330. Once obstruction 330 has been identified, obstruction notification module 240 can transmit information regarding the identified obstruction 330 to one or more of the vehicles in predefined geographical area 300. This can include vehicles that have recently traveled into predefined geographical area 300 since the potential obstruction was detected. Note that, in some embodiments, obstruction detection system 170 resides in one or more servers that are separate from the vehicles 320a-f. In other embodiments, obstruction detection system 170 resides in one or more of the vehicles in predefined geographical area 300 or in another location.

Figure 4:
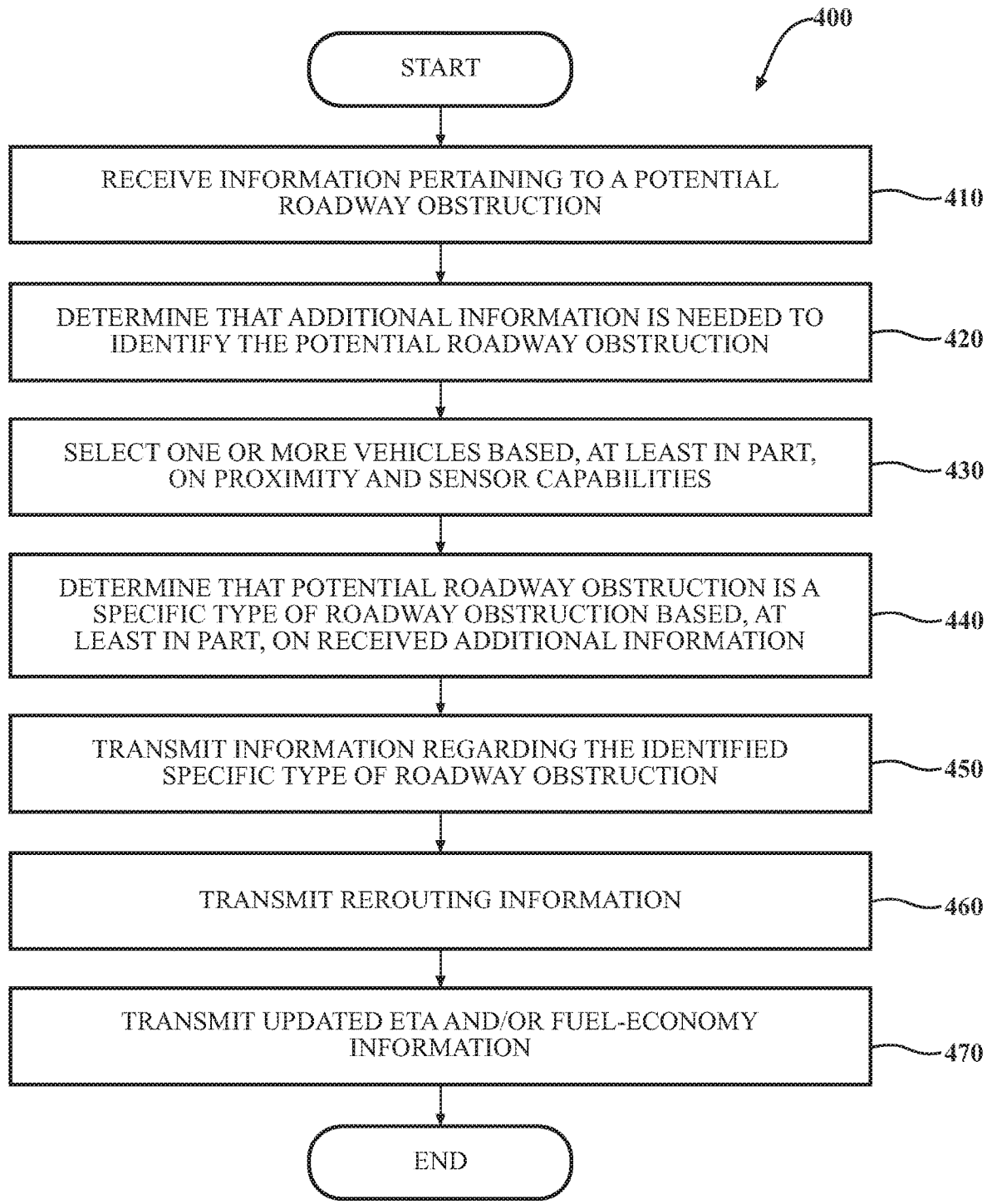
FIG. 4 is a flowchart of a method of roadway obstruction detection, in accordance with an illustrative embodiment of the invention.

FIG. 4 is a flowchart of a method 400 of roadway obstruction detection, in accordance with an illustrative embodiment of the invention. Method 400 will be discussed from the perspective of obstruction detection system 170 in FIG. 2. While method 400 is discussed in combination with obstruction detection system 170, it should be appreciated that method 400 is not limited to being implemented within obstruction detection system 170, but obstruction detection system 170 is instead one example of a system that may implement method 400.

At block 410, obstruction monitoring module 220 receives information pertaining to a potential roadway obstruction. As discussed above, this information can, in some embodiments, be received from one or more networked vehicles. The received potential obstruction information 265 can include a notification or alert regarding the potential obstruction, or it can include raw sensor data that obstruction monitoring module 220 analyzes to determine that a potential obstruction exists.

At block 420, obstruction monitoring module 220 determines that additional information regarding the potential roadway obstruction is needed to identify or otherwise characterize the potential roadway obstruction. At block 430, obstruction characterization module 230 selects one or more vehicles from a plurality of vehicles based, at least in part, on their proximity to the potential roadway obstruction and their sensor capabilities. As discussed above, obstruction characterization module 230 selects vehicles that are in the vicinity of the potential obstruction and that are equipped with sensors such as image and/or LIDAR sensors.

At block 440, obstruction characterization module 230 determines that the potential roadway obstruction is a specific type of roadway obstruction based, at least in part, on additional information 270 regarding the potential roadway obstruction received from at least one of the selected one or more vehicles. As discussed above, in some embodiments, the network via which obstruction characterization module 230 communicates with the one or more vehicles includes a mesh network. As also discussed above, the received additional information 270 can include an identification or other characterization of an obstruction 330 from one or more networked vehicles, or it can include raw sensor data from one or more networked vehicles that obstruction characterization module 230 analyzes to identify or otherwise characterize the obstruction 330.

Not all embodiments of method 400 include blocks 450, 460, and 470. In an embodiment that includes these blocks, at block 450, obstruction notification module 240 transmits information regarding the identified specific type of roadway obstruction to at least one vehicle in the plurality of vehicles, as discussed above. At block 460, rerouting module 250 transmits, to the at least one vehicle in the plurality of vehicles, rerouting information 275 to avoid the identified specific type of roadway obstruction. At block 470, rerouting module 250 transmits, to the at least one vehicle in the plurality of vehicles, updated information regarding ETA (ETA data 280), fuel economy (fuel economy data 285), or both based on the rerouting information.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and/or orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The processor(s) 110, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the obstruction detection system 170, and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 either independently or in combination with the obstruction detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-4, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for roadway obstruction detection, the system comprising:
   one or more processors; and
   a memory communicably coupled to the one or more processors and storing:
   an obstruction monitoring module including instructions that when executed by the one or more processors cause the one or more processors to:
   receive information pertaining to a potential roadway obstruction, wherein the potential roadway obstruction is an unidentified stationary object on the roadway and the unidentified stationary object is one of a foreign object, a stalled vehicle, a barricade, and a vehicle associated with an accident; and
   determine that additional information regarding the potential roadway obstruction is needed to identify the potential roadway obstruction;
   an obstruction characterization module including instructions that when executed by the one or more processors cause the one or more processors to:
   select one or more vehicles from a plurality of vehicles based, at least in part, on their proximity to the potential roadway obstruction and their sensor capabilities; and
   determine that the potential roadway obstruction is a specific type of roadway obstruction based, at least in part, on additional information regarding the potential roadway obstruction received from at least one of the selected one or more vehicles;
   an obstruction notification module including instructions that when executed by the one or more processors cause the one or more processors to transmit information regarding the specific type of roadway obstruction to at least one vehicle in the plurality of vehicles; and
   a rerouting module including instructions that when executed by the one or more processors cause the one or more processors to transmit, to the at least one vehicle in the plurality of vehicles, rerouting information to avoid the identified specific type of roadway obstruction.

2. The system of claim 1, wherein the rerouting module includes further instructions to transmit, to the at least one vehicle in the plurality of vehicles, updated information regarding at least one of estimated time of arrival and fuel economy based on the rerouting information.

3. The system of claim 1, wherein the information pertaining to a potential roadway obstruction includes raw sensor data and the obstruction characterization module includes further instructions to analyze the raw sensor data to determine that the potential roadway obstruction exists.

4. The system of claim 1, wherein the information pertaining to a potential roadway obstruction includes a notification regarding the potential roadway obstruction.

5. The system of claim 1, wherein the obstruction characterization module includes instructions that cause the one or more processors to communicate with the selected one or more vehicles via a network that includes a mesh network.

6. The system of claim 1, wherein the one or more processors and the memory are part of one or more servers that are separate from the plurality of vehicles.

7. The system of claim 1, wherein the additional information includes an identification of the potential roadway obstruction as the specific type of roadway obstruction.

8. The system of claim 1, wherein the additional information includes raw sensor data and the obstruction characterization module includes further instructions to analyze the raw sensor data to identify the potential roadway obstruction as the specific type of roadway obstruction.

9. A non-transitory computer-readable medium for roadway obstruction detection and storing instructions that when executed by one or more processors cause the one or more processors to:
   receive information pertaining to a potential roadway obstruction, wherein the potential roadway obstruction is an unidentified stationary object on the roadway and the unidentified stationary object is one of a foreign object, a stalled vehicle, a barricade, and a vehicle associated with an accident;
   determine that additional information regarding the potential roadway obstruction is needed to identify the potential roadway obstruction;
   select one or more vehicles from a plurality of vehicles based, at least in part, on their proximity to the potential roadway obstruction and their sensor capabilities;
   determine that the potential roadway obstruction is a specific type of roadway obstruction based, at least in part, on additional information regarding the potential roadway obstruction received from at least one of the selected one or more vehicles;
   transmit information regarding the specific type of roadway obstruction to at least one vehicle in the plurality of vehicles; and
   transmit, to the at least one vehicle in the plurality of vehicles, rerouting information to avoid the identified specific type of roadway obstruction.

10. A method of roadway obstruction detection, the method comprising:
- receiving information pertaining to a potential roadway obstruction, wherein the potential roadway obstruction is an unidentified stationary object on the roadway and the unidentified stationary object is one of a foreign object, a stalled vehicle, a barricade, and a vehicle associated with an accident;
- determining that additional information regarding the potential roadway obstruction is needed to identify the potential roadway obstruction;
- selecting one or more vehicles from a plurality of vehicles based, at least in part, on their proximity to the potential roadway obstruction and their sensor capabilities;
- determining that the potential roadway obstruction is a specific type of roadway obstruction based, at least in part, on additional information regarding the potential roadway obstruction received from at least one of the selected one or more vehicles;
- transmitting information regarding the specific type of roadway obstruction to at least one vehicle in the plurality of vehicles; and
- transmitting, to the at least one vehicle in the plurality of vehicles, rerouting information to avoid the identified specific type of roadway obstruction.

11. The method of claim 10, further comprising:
- transmitting, to the at least one vehicle in the plurality of vehicles, updated information regarding at least one of estimated time of arrival and fuel economy based on the rerouting information.

12. The method of claim 10, wherein the information pertaining to a potential roadway obstruction includes raw sensor data and the method further comprises analyzing the raw sensor data to determine that the potential roadway obstruction exists.

13. The method of claim 10, wherein the information pertaining to a potential roadway obstruction includes a notification regarding the potential roadway obstruction.

14. The method of claim 10, wherein the additional information includes an identification of the potential roadway obstruction as the specific type of roadway obstruction.

15. The method of claim 10, wherein the additional information includes raw sensor data and the method further comprises analyzing the raw sensor data to identify the potential roadway obstruction as the specific type of roadway obstruction.

* * * * *